(12) United States Patent
Tarver

(10) Patent No.: US 7,189,469 B2
(45) Date of Patent: Mar. 13, 2007

(54) FUEL CELL ASSEMBLY AND METHOD OF MAKING THE SAME

(75) Inventor: Gary David Tarver, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 598 days.

(21) Appl. No.: 10/690,997

(22) Filed: Oct. 21, 2003

(65) Prior Publication Data

US 2005/0084733 A1 Apr. 21, 2005

(51) Int. Cl.
*H01M 2/06* (2006.01)

(52) U.S. Cl. .............. 429/34; 429/36; 429/38; 429/39; 429/32; 29/730

(58) Field of Classification Search ............ 429/34, 429/36, 38, 39; 29/730
See application file for complete search history.

(56) References Cited

U.S. PATENT DOCUMENTS

| | | | |
|---|---|---|---|
| 4,289,369 A | | 9/1981 | Taketoshi |
| 6,027,575 A | * | 2/2000 | Paruchuri et al. ............ 148/24 |
| 6,113,406 A | | 9/2000 | Lin et al. |
| 6,187,466 B1 | | 2/2001 | Schroll et al. |
| 2001/0044043 A1 | * | 11/2001 | Badding et al. .............. 429/40 |
| 2003/0188637 A1 | * | 10/2003 | Ito et al. ...................... 96/108 |

* cited by examiner

*Primary Examiner*—Bruce F. Bell

(57) ABSTRACT

A fuel cell assembly including a liquid metal seal and/or a liquid metal interconnect.

36 Claims, 5 Drawing Sheets

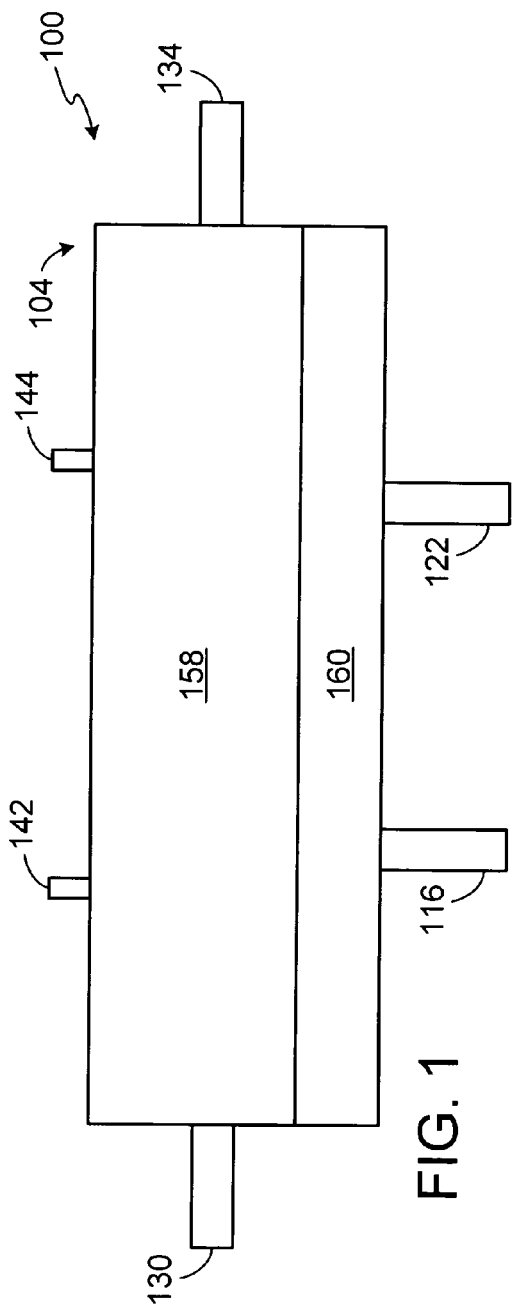
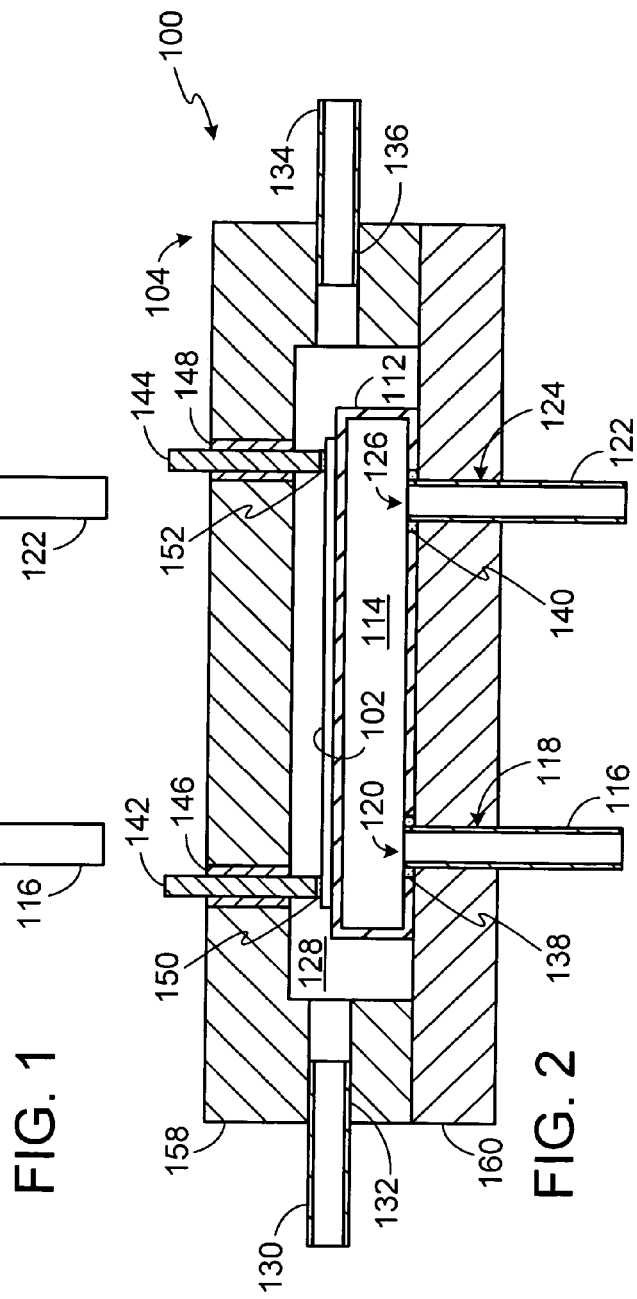
FIG. 1
FIG. 2

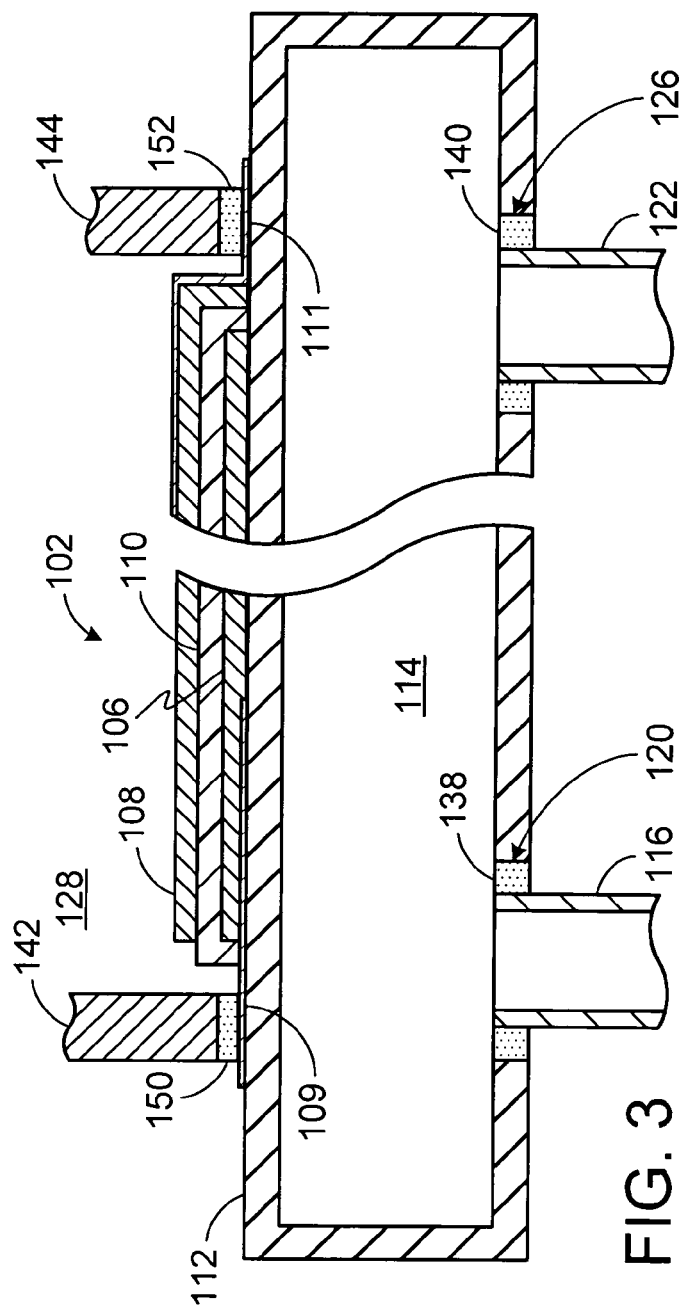
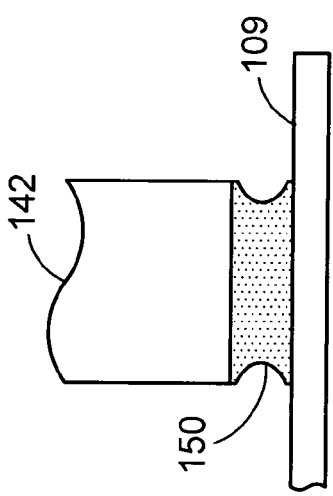
FIG. 3
FIG. 4

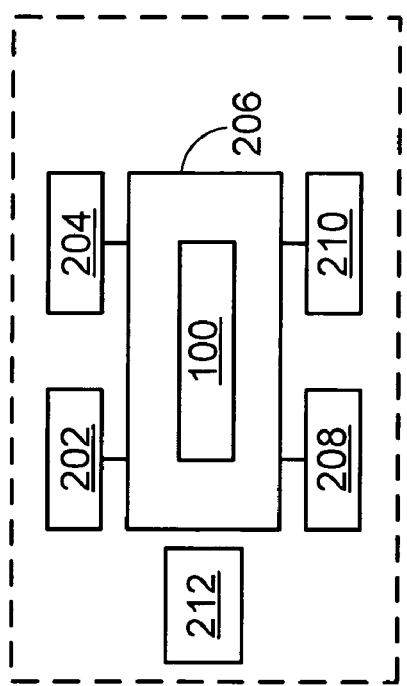
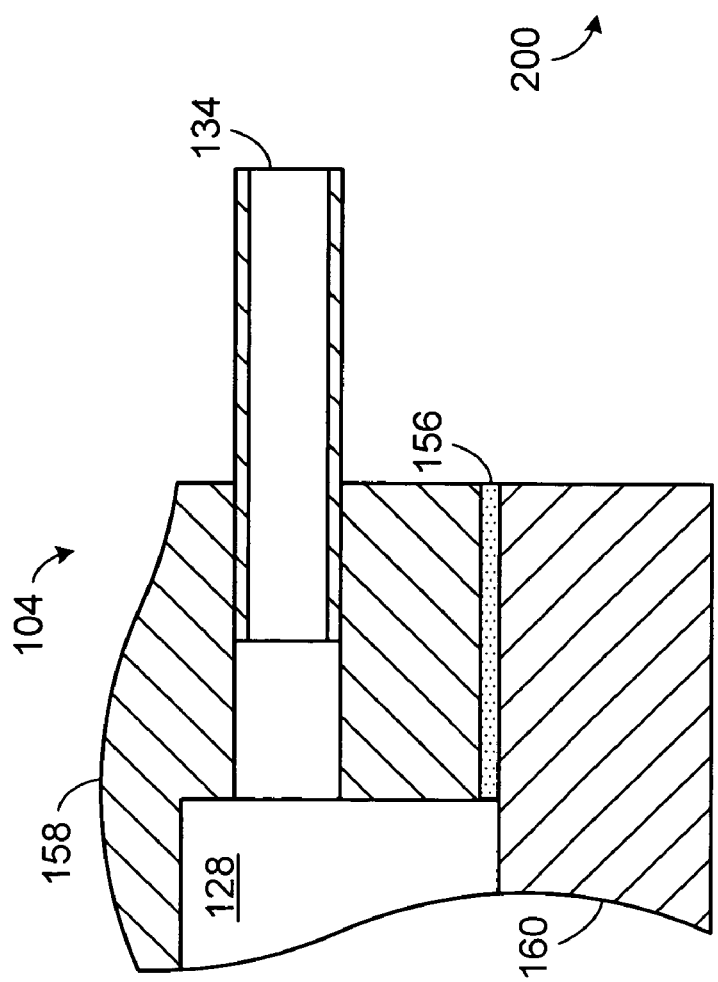
FIG. 5
FIG. 6

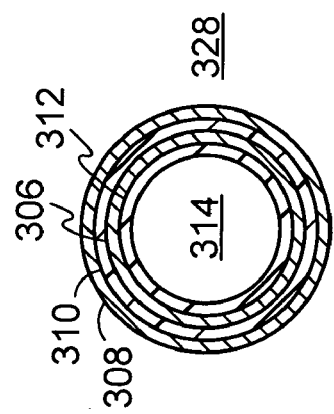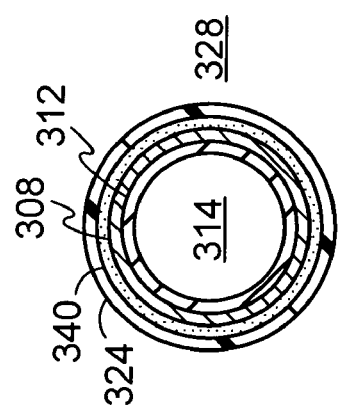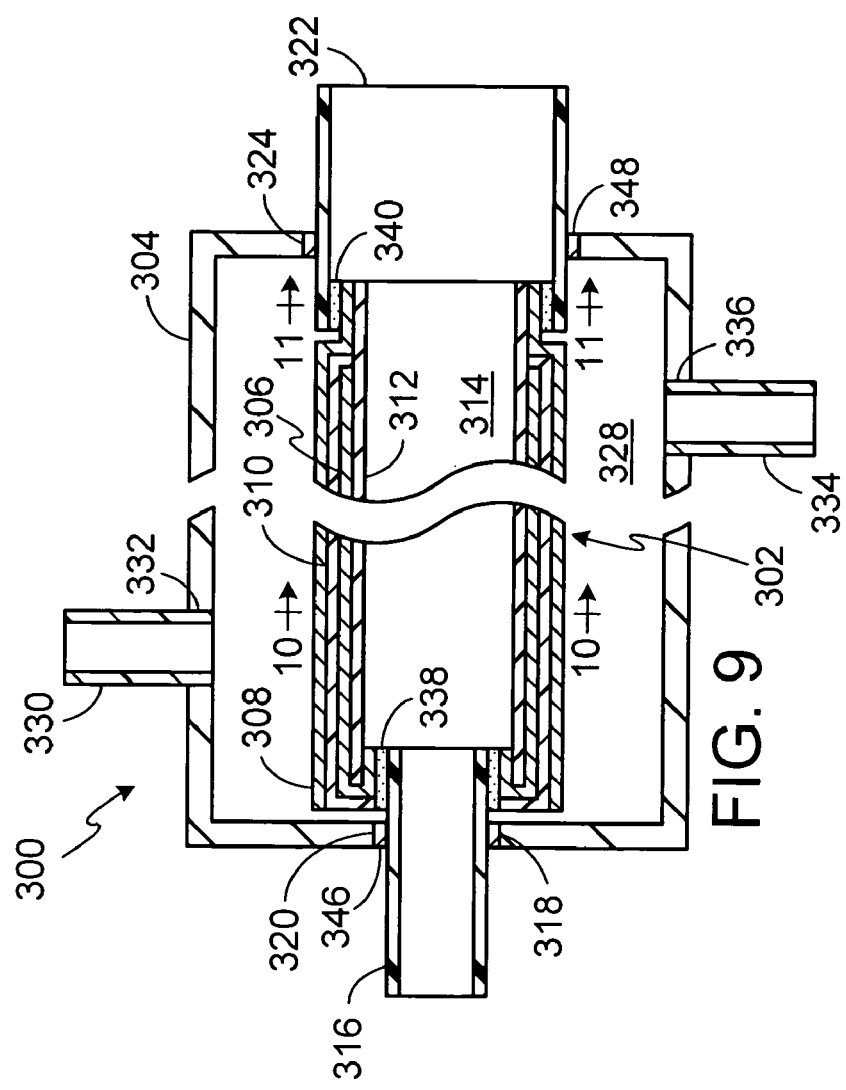

FUEL CELL ASSEMBLY AND METHOD OF MAKING THE SAME

BACKGROUND OF THE INVENTIONS

1. Field of the Inventions

The present inventions are related to fuel cell assemblies and methods of making fuel cell assemblies.

2. Description of the Related Art

Fuel cells, which convert reactants (i.e. fuel and oxidant) into electricity and reaction products, are advantageous because they are not hampered by lengthy recharging cycles, as are rechargeable batteries, and are relatively small, lightweight and produce virtually no environmental emissions. Nevertheless, the present inventor has determined that conventional fuel cells are susceptible to improvement. For example, the present inventor has determined that many fuel cells include seals between two structures that have different coefficients of thermal expansion and that such seals can be difficult to maintain over a wide temperature range. The present inventor has also determined that it can be difficult to maintain electrical connection between high and low temperature environments such as the interior of a fuel cell assembly and the exterior of a fuel cell assembly.

BRIEF DESCRIPTION OF THE DRAWINGS

Detailed description of embodiments of the inventions will be made with reference to the accompanying drawings.

FIG. 1 is a side view of a fuel cell assembly in accordance with one embodiment of a present invention.

FIG. 2 is a section view of the fuel cell assembly illustrated in FIG. 1.

FIG. 3 is an enlarged section view of a portion of the fuel cell assembly illustrated in FIG. 1.

FIG. 4 is a side view of a liquid metal interconnect in accordance with one embodiment of a present invention.

FIG. 5 is a section view in accordance with an embodiment of a present invention.

FIG. 6 is a diagrammatic view of a fuel cell system in accordance with an embodiment of a present invention.

FIG. 9 is a section view of a fuel cell assembly in accordance with one embodiment of a present invention.

FIG. 10 is a section view taken along line 10—10 in FIG. 9.

FIG. 11 is a section view taken along line 11—11 in FIG. 9.

DETAILED DESCRIPTION OF THE EMBODIMENTS

Figure 7:
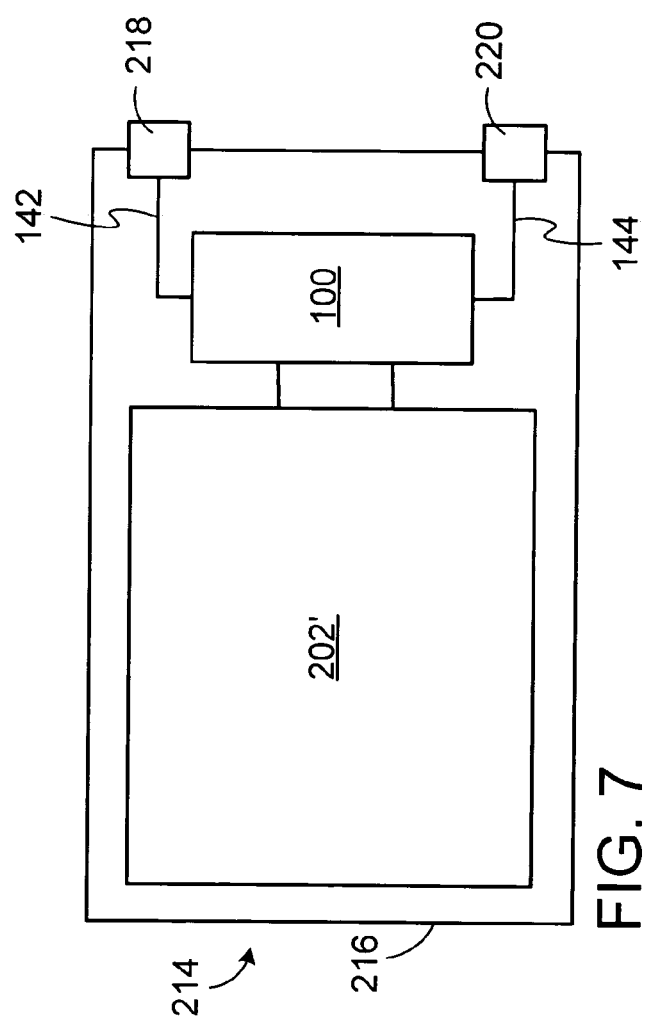
FIG. 7 is a diagrammatic view of a fuel cell system in accordance with an embodiment of a present invention.

The following is a detailed description of the best presently known modes of carrying out the inventions. This description is not to be taken in a limiting sense, but is made merely for the purpose of illustrating the general principles of the inventions. It is noted that detailed discussions of fuel cell structures that are not pertinent to the present inventions have been omitted for the sake of simplicity. The present inventions are also applicable to a wide range of fuel cell technologies and fuel cell systems, including those presently being developed or yet to be developed. For example, although various exemplary fuel cell system are described below with reference to solid oxide fuel cells ("SOFCs"), other types of fuel cells, such as proton exchange membrane ("PEM") fuel cells, are equally applicable to the present inventions.

As illustrated for example in FIGS. 1–4, a fuel cell assembly 100 in accordance with one embodiment of a present invention includes a fuel cell 102 packaged in housing 104. The exemplary fuel cell 102, which is a SOFC, includes an anode 106 and a cathode 108 separated by an electrolyte 110. Current collectors 109 and 111 are respectively associated with the anode 106 and cathode 108. The housing 104 includes a support structure 112 that supports the fuel cell 102, with the anode 106 is adjacent to the support structure. The support structure 112 also defines a fuel chamber 114.

Fuel, such as $H_2$ or hydrocarbon fuels such as $CH_4$, $C_2H_6$, $C_3H_8$, etc., is directed into the housing 104 and fuel chamber 114 by way of a fuel supply tube 116 that extends through apertures 118 and 120 in the housing and into the fuel chamber 114. The fuel passes through the portion of the support structure 112 on which the fuel cell 102 is supported. At least the portion of the support structure on which the anode 106 is supported is formed from a porous material, such as a porous ceramic, or has apertures formed therein. In one exemplary implementation, the entire support structure 112 is formed from a porous material and, with the exception of the portion that supports the anode 106, the entire support structure is sealed with an electrically non-conductive glaze. An outlet tube 122 extends through apertures 124 and 126 in the housing 104 and the support structure 112. The exemplary housing 104 also defines an oxidant chamber 128. Oxidant for the cathode 108, such as $O_2$ or ambient air, is directed into the oxidant chamber 128 by way of an oxidant supply tube 130 that extends through an aperture 132 at one end of the housing 104. An outlet tube 134 extends through an aperture 136 at the other end of the housing 104. Although the tubes 116, 122, 130 and 134 are substantially circular in cross-section in the exemplary embodiment, they may be any suitable cross-sectional shape.

In the exemplary embodiment illustrated in FIGS. 1–4, liquid metal seals 138 and 140 are positioned between the fuel supply tube 116 and the support structure aperture 120, and the outlet tube 122 and the support structure aperture 126. Liquid metal seals, which are discussed in greater detail below, are especially useful in those instances where the sealed structures (e.g. the support structure 112 and the tubes 116 and 122) are formed from materials that have different coefficients of thermal expansion and there is a significant difference between the relatively low final assembly, non-operating, shipping and storage temperatures (e.g. about −30 to 50° C.) and the operating temperature (e.g. about 500 to 1000° C. in a SOFC) of the fuel cell. Such differences cause stresses in the seals and/or the sealed structures when the fuel cell reaches the operating temperature. These stresses can be sufficient to break conventional seals and/or the structures being sealed. The use of liquid metal seals on the other hand, typically in a thin (e.g. about 0.1 mm to 1 mm) capillary space between the sealed structures, allows the sealed structures to expand and contract at different rates without putting any significant stress on the seal because there is no rigid connection. The stress is instead limited to the surface tension of the liquid metal, which is negligible. Additionally, because the capillary force on the liquid is higher than the pressure within the fuel chamber 114 (typi cally less than 3 psi), the seals will be able to withstand the pressure differential across the seals. Liquid metal seals are also capable of maintaining the seal over many high/low temperature cycles as the fuel cell is turned off and on.

When liquid metal seals are used to form a seal between ceramic structures and metal structures (e.g. the support structure 112 and the tubes 116 and 122), the ceramic should be conditioned to promote bonding with the metal. A suitable conditioning method involves the use of a strong alkaline cleaner, a de-ionized water rinse, an alcohol rinse and heating up to about 350° C. Ultrasonic agitation may be used to augment the wetting of the ceramic.

During operation of the exemplary fuel cell assembly 100, the oxidant is electrochemically ionized at the cathode 108, thereby producing ions that diffuse through the conducting electrolyte 110 and react with the fuel at the anode 106 to produce byproducts ($CO_2$ and water vapor in the exemplary embodiment). The reaction byproducts and unused reactants (if any) are vented out of the housing 104 by way of the outlet tubes 122 and 134. The current collectors 109 and 111, which are respectively connected to the anode 106 and cathode 108, are also connected to electrical conductors 142 and 144. The conductors 142 and 144 may be connected to a power consuming device, or may be connected to the conductors of other fuel cells in series or parallel. Insulators 146 and 148 are positioned between the housing 104 and the electrical conductors 142 and 144. The electrical conductors 142 and 144 are not limited to the illustrated orientation and, for example, may be assembled to extend in a horizontal plane (when the assembly 100 is in the orientation illustrated in FIG. 2).

Referring more specifically to FIG. 3, liquid metal interconnects 150 and 152 respectively connect the current collectors 109 and 111 to the electrical conductors 142 and 144. Liquid metal interconnects, which are discussed in greater detail below, are especially useful in those instances where one portion of an electrical conductor is in a relatively low temperature environment (e.g. 50 to 600° C.), such as the outside of a fuel cell assembly, and the other portion is in a relatively high temperature environment (e.g. 500 to 1000° C.), such as the interior of a fuel cell assembly.

There are a number of advantages associated with the use of liquid metal interconnects. In those instances where the current collectors 109 and 111 and conductors 142 and 144 have different coefficients of thermal expansion, the current collectors and conductors will be able to expand and contract at different rates during thermal cycles without putting any significant stress on the interconnects. More specifically, it may be desirable to use relatively thick metal conductors with good conductivity in combination with very thin current collectors (e.g. 10 to 300 microns) that are carried by a ceramic support structure. The thin current collectors will expand and contract with the ceramic, which has a different coefficient of thermal expansion than the metal conductors. Additionally, the liquid metal will help keep oxygen out of the interconnect area, thereby minimizing corrosion at the interconnect that can lead to increased resistance and a loss of power transmission.

Although the materials, dimensions, and configuration of the exemplary fuel cell assembly 100 will depend upon the type of fuel cell (e.g. SOFC, PEM, etc.) and intended application, and although the present inventions are not limited to any particular materials, dimensions, configuration or type, an exemplary fuel cell assembly including a SOFC is described below. The exemplary fuel cell 102 is a "thin" fuel cell. The anode 106 in the exemplary fuel cell 102 may be a porous, ceramic and metal composite (also referred to as "cermet") film that is about 10–20 μm thick. Suitable ceramics include samaria-doped ceria ("SDC"), gandolinia-doped ceria (GDC) and yttria stabilized zirconia ("YSZ") and suitable metals include nickel and copper, among others. The exemplary cathode 108 may be a porous ceramic film that is about 10–20 μm thick. Suitable ceramic materials include samarium strontium cobalt oxide ("SSCO"), lanthanum strontium manganate, bismuth copper substituted vanadate, and other similar materials. The electrolyte may be a non-porous ceramic film, such as SDC, GDC or YSZ, that is about 5–10 μm thick.

Turning to the exemplary support structure 112, it is preferably formed from porous material that is strong and inert, such as a ceramic material (e.g. alumina, stabilized zirconia, magnesia, or forsterite), a metallic material (e.g. stainless steel or Inconel®), or a combination thereof. Additionally, the support structure material that is selected for a particular fuel cell should have a coefficient of expansion that matches the anode, cathode, and electrolyte. The support structure 112 will typically be about 1 mm thick. The volume of the fuel chamber 114 will depend on the size and type of the associated fuel cell 102.

With respect to the liquid metal seals and interconnects, suitable metals include those with a large melting point temperature to boiling point temperature range. The range should encompass the range of temperatures that the corresponding fuel cell assembly may experience over its life. In the case of a SOFC, for example, the temperature will typically range from about −30 to 50° C. to about 500 to 1000° C. For example, the temperature range of some SOFCs is about 22° C. (about room temperature) to about 900° C. With respect to liquid metal seals, suitable metals include gallium, indium, tin, zinc and alloys thereof gallium, indium and alloys thereof are also well suited for liquid metal interconnects. One specific example of a metal that is suitable for both liquid metal seals and liquid metal interconnects is an alloy that consists of 75.5% gallium and 24.5% indium. The melting point of this alloy is about 16° C. (below room temperature) and the boiling point is about 2000° C. (above the operating temperature of the SOFC). Generally speaking, the melting point should not be more than 100° C. and the boiling point should be at least 1500° C. in most SOFC applications. The 75.5% gallium/24.5% indium alloy also has a low vapor pressure and will not vaporize at the typical operating temperatures of a SOFC, as well as good conductivity.

The metal used to form the liquid metal seals and interconnects should also be malleable and ductile when it solidifies. This is especially important in those instances where the fuel cell assembly will be exposed to very low temperatures (e.g. below 16° C., the solidification temperature of the liquid metal in the illustrated embodiment). The malleability and ductility of the metal used for the seal will allow the seal to accommodate some relative movement between the sealed portions of the fuel cell assembly (e.g. the support structure 112 and the tubes 116 and 122) that are formed from materials that have different coefficients of thermal expansion. This is especially important in the context of handling, shipping and storage in cold weather. The malleability and ductility of the seals and interconnects also make the fuel cell assembly more robust when not running. Because indium is extremely malleable and ductile at low temperatures (substantially below −30° C.), alloys including indium are especially useful. Additionally, there may be instances where it will be desirable for the seals to expand, contract or stay the same size as the seals enter the solid phase at extremely low temperatures. With respect to gallium/indium alloys, for example there can be from 2.5% contraction to 0% contraction to 3.0% expansion, depending on the relative amounts of gallium and indium in the alloy.

Liquid metal seals may also be used to form a seal between other fuel cell assembly components. Turning to FIG. 5, the housing 104 may be provided with a liquid metal seal 156 between the top and bottom housing members 158 and 160.

The fuel cell assemblies described above may be used in a wide variety of applications. As illustrated for example in FIG. 6, a fuel cell system 200 may be provided with one or more of the fuel cell assemblies 100 illustrated in FIGS. 1–4. The exemplary fuel cell system 200 includes a fuel cell assembly 100 that is connected to a fuel supply 202 and an oxidant supply 204. In those instances where ambient air is used as the oxidant, the oxidant supply may simply be a vent or a vent and fan arrangement. The fuel and oxidant are transferred to the fuel and oxidant supply tubes 116 and 130 in the assembly 100 by a manifold arrangement in a package 206. The byproducts and any unused reactants are vented out of the package 206 by way of outlets 208 and 210, which are connected to the outlet tubes 122 and 134 in the assembly 100. A controller 212 may be provided to monitor and control the operations of the exemplary fuel cell system 200. Alternatively, the operation of the fuel cell system may be controlled by the host (i.e. power consuming) device.

It should be noted that the present fuel cell systems 200 include those in which the fuel supply and/or oxidant supplies is replenishable (or replaceable) as well as those in which all of the fuel that will be consumed is initially present in the fuel supply. The fuel supply 202 in the exemplary system 200 can be either replenishable or replaceable. Alternatively, in the exemplary fuel cell system 214 illustrated in FIG. 7, all of the fuel that will be consumed is initially present in the fuel supply 202'. The fuel supply 202' and fuel cell assembly 100 are located within a housing 216. A pair of electrical contacts 218 and 220, which are carried on the exterior of the housing 216, are connected to the fuel cell assembly 100 by the electrical conductors 142 and 144.

Figure 8:
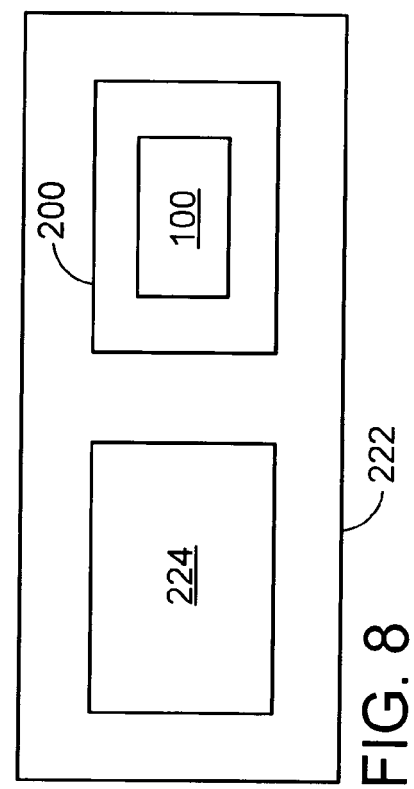
FIG. 8 is a diagrammatic view of a power consuming apparatus in accordance with an embodiment of a present invention.

The exemplary fuel cell assembly 100 may also be incorporated into a wide variety of power consuming apparatus. Examples of power consuming apparatus include, but are not limited to, information processing devices such as notebook personal computers ("PCs"), handheld PCs, palm-top PCs and personal digital assistants ("PDAs"), communication devices such as mobile telephones, wireless e-mail appliances and electronic books, video games and other toys, and audio and video devices such as compact disk players and video cameras. Other electronic devices include portable test systems, portable projectors, and portable televisions such as portable flat panel televisions. Referring to FIG. 8, an exemplary apparatus 222 includes a fuel cell system 200 (which includes the fuel cell assembly 100) and a power consuming device 224 that is powered by the fuel cell system 200. The exemplary power consuming device refers to any or all devices within the particular apparatus than consume electrical power.

An exemplary fuel cell assembly, which is generally represented by reference numeral 300 in FIG. 9, is provided with liquid metal devices that act as both a seal and an interconnect. The exemplary fuel cell assembly 300 includes a tubular fuel cell 302 packaged in tubular housing 304. Referring to FIG. 10, the exemplary fuel cell 302, which is a SOFC, includes an anode 306 and a cathode 308 separated by an electrolyte 310. Current collectors (not shown) are associated with the anode 306 and cathode 308. The housing 304 includes a tubular support structure 312 that supports the fuel cell 302 and the anode 306 is adjacent to the support structure. The support structure 312 also defines a fuel chamber 314.

Fuel is directed into the housing 304 and fuel chamber 314 by way of a fuel supply tube 316 that extends through apertures 318 and 320 in the housing 304 and the fuel cell 302. The fuel passes through the support structure 312 on which the anode 306 is supported and, to that end, at least the portion of the support structure on which the anode is supported is formed from a porous material, such as a porous ceramic, or has apertures formed therein. An outlet tube 322 is connected to the downstream end of the fuel cell 302 and extends through an aperture 324 in the housing 304. The exemplary housing 304 also defines an oxidant chamber 328. Oxidant for the cathode 308, such as $O_2$ or ambient air, is directed into the oxidant chamber 328 by way of an oxidant supply tube 330 that extends through an aperture 332 near the upstream end of the housing 304. An outlet tube 334 extends through an aperture 336 near the downstream end of housing 304.

The exemplary fuel cell assembly 300 illustrated in FIGS. 9–11 operates in substantially the same manner as the fuel cell assembly 100. Here, however, the fuel supply tube 316 and the outlet tube 322 are both formed from conductive material and act as conductors, much like the conductors 142 and 144 in the exemplary fuel cell assembly 100 in FIGS. 1–4. The current collectors (not shown), which are respectively connected to the anode 306 and cathode 308, are connected to electrically conductive tubes 316 and 322 by liquid metal seal/interconnects 338 and 340. In addition to electrically connecting and sealing the tubes 316 and 322 to the current collectors associated with the anode and cathode 306 and 308, the liquid metal seal/interconnects 338 and 340 also form seals between the housing 304 and tube 316 and between the fuel cell 302 and tube 322. The conductive fuel supply and outlet tubes 316 and 322 may be electrically connected to a power consuming device, or may be connected to the conductors of other fuel cells in series or parallel. Insulators 346 and 348 may be provided between the housing 304 and the conductive fuel supply and outlet tubes 316 and 322 in order to electrically insulate the housing from the tubes.

Although the materials, dimensions, and configuration of the exemplary fuel cell assembly 300 will depend upon the type of fuel cell (e.g. SOFC, PEM, etc.) and intended application, and although the present inventions are not limited to any particular materials, dimensions, configuration or type, the exemplary fuel cell 302 is an SOFC formed from the materials described above. The overall thickness of the fuel cell 302, as well as the respective thicknesses of the anode 306, cathode 308, electrolyte 310 and support structure 312, are also essentially the same as those described above. In one exemplary embodiment, the length of the fuel cell 302 will be about 25 mm to 1 m and the inner diameter of the support structure 312 will be about 5 mm to 50 mm.

The exemplary fuel cell assembly may also be reconfigured in a variety of ways. For example, the positions of the anode 306 and cathode 308 may be reversed. Here, fuel is directed into the open region within the housing by way of the supply tube 330 and fuel-side byproduct exits by way of the tube 334, while oxidant enters by way of the supply tube 316 and oxidant-side byproducts exit by way of the tube 322. Additionally, while the tubes 316, 322, 330 and 334 are substantially circular in cross-section in the exemplary embodiment, they may be any suitable cross-sectional shape.

Although the present inventions have been described in terms of the preferred embodiments above, numerous modifications and/or additions to the above-described preferred embodiments would be readily apparent to one skilled in the art. It is intended that the scope of the present inventions extend to all such modifications and/or additions.

I claim:

1. A fuel cell assembly, comprising:
a housing defining an interior and an exterior;
a fuel cell located within the housing;
at least one electrical conductor that extends from the interior of the housing to the exterior of the housing; and
at least one liquid metal electrical interconnect that electrically connects the fuel cell to the at least one electrical conductor.

2. A fuel cell assembly as claimed in claim 1, wherein
the fuel cell comprises an anode and a cathode;
the at least one electrical conductor comprises a positive electrical conductor and a negative electrical conductor; and
the at least one liquid metal electrical interconnect comprises a first liquid metal electrical interconnect that electrically connects the anode to the negative electrical conductor and a second liquid metal electrical interconnect that electrically connects the cathode to the positive electrical conductor.

3. A fuel cell assembly as claimed in claim 1, wherein the fuel cell comprises a solid oxide fuel cell.

4. A fuel cell assembly as claimed in claim 1, wherein the fuel cell comprises a substantially tubular fuel cell.

5. A fuel cell assembly as claimed in claim 1, wherein the liquid metal electrical interconnect comprises a material having a boiling point of at least about 1500° C.

6. A fuel cell assembly as claimed in claim 1, wherein
the fuel cell has an operating temperature; and
the liquid metal electrical interconnect comprises a material having a boiling point that is greater than the operating temperature of the fuel cell.

7. A fuel cell assembly as claimed in claim 1, wherein the liquid metal electrical interconnect comprises a material having a melting point of not more than about 100° C.

8. A fuel cell assembly as claimed in claim 1, wherein the liquid metal electrical interconnect comprises an indium-gallium alloy.

9. A fuel cell assembly as claimed in claim 8, wherein indium-gallium alloy comprises about 24.5% indium and about 75.5% gallium.

10. A fuel cell assembly, comprising:
a housing assembly including at least one reactant chamber and a plurality of housing components, one of which is a reactant tube that is operably connected to the reactant chamber;
a fuel cell located within the housing assembly; and
at least one liquid metal electrical interconnect/seal that electrically connects the fuel cell to the reactant tube and forms a seal between the at least one reactant chamber and the reactant tube.

11. A fuel cell assembly as claimed in claim 10, wherein the fuel cell comprises a substantially tubular fuel cell.

12. A fuel cell assembly as claimed in claim 10, wherein the fuel cell comprises a solid oxide fuel cell.

13. A fuel cell assembly as claimed in claim 10, wherein the liquid metal electrical interconnect/seal comprises a material having a boiling point of at least about 1500° C.

14. A fuel cell assembly as claimed in claim 10, wherein
the fuel cell has an operating temperature; and
the liquid metal electrical interconnect/seal comprises a material having a boiling point that is greater than the operating temperature of the fuel cell.

15. A fuel cell assembly as claimed in claim 10, wherein the liquid metal electrical interconnect/seal comprises a material having a melting point of not more than about 100° C.

16. A fuel cell assembly as claimed in claim 10, wherein the liquid metal electrical interconnect/seal comprises an indium-gallium alloy.

17. A fuel cell assembly as claimed in claim 16, wherein indium-gallium alloy comprises about 24.5% indium and about 75.5% gallium.

18. A fuel cell system, comprising:
a reactant supply; and
a fuel cell assembly including
a housing defining an interior and an exterior;
a fuel cell located within the housing and operably connected to the reactant supply;
at least one electrical conductor that extends from the interior of the housing to the exterior of the housing, and
at least one liquid metal electrical interconnect that electrically connects the fuel cell to the at least one electrical conductor.

19. A fuel cell system as claimed in claim 18, wherein the reactant supply comprises a fuel supply.

20. A fuel cell system as claimed in claim 18, wherein
the fuel cell comprises an anode and a cathode;
the at least one electrical conductor comprises a positive electrical conductor and a negative electrical conductor; and
the at least one liquid metal electrical interconnect comprises a first liquid metal electrical interconnect that electrically connects the anode to the negative electrical conductor and a second liquid metal electrical interconnect that electrically connects the cathode to the positive electrical conductor.

21. A fuel cell system as claimed in claim 18, wherein the fuel cell comprises a solid oxide fuel cell.

22. A fuel cell system as claimed in claim 18, wherein
the fuel cell has an operating temperature; and
the liquid metal electrical interconnect comprises a material having a boiling point that is greater than the operating temperature of the fuel cell.

23. A fuel cell system as claimed in claim 18, wherein the liquid metal electrical interconnect comprises a material having a melting point of not more than about 100° C.

24. A fuel cell system, comprising:
a reactant supply; and
a fuel cell assembly including
a housing assembly including at least one reactant chamber and a plurality of housing components, one of which is a reactant tube that operably connects the reactant chamber to the reactant supply;
a fuel cell located within the housing assembly, and
at least one liquid metal electrical interconnect/seal that electrically connects the fuel cell to the reactant tube and forms a seal between the at least one reactant chamber and the reactant tube.

25. A fuel cell system as claimed in claim 24, wherein the fuel cell comprises a solid oxide fuel cell.

26. A fuel cell system as claimed in claim 24, wherein
the fuel cell has an operating temperature; and
the liquid metal electrical interconnect/seal comprises a
material having a boiling point that is greater than the
operating temperature of the fuel cell.

27. A fuel cell system as claimed in claim 26, wherein the
liquid metal electrical interconnect/seal comprises a material
having a melting point of not more than about 100° C.

28. A method of making a fuel cell assembly, comprising
the step of:
forming a liquid metal electrical interconnect between a
fuel cell that is located within a housing and at least one
electrical conductor that extends outside the housing.

29. A method of making a fuel cell assembly as claimed
in claim 28, wherein the step of forming a liquid metal
electrical interconnect comprises forming a liquid metal
electrical interconnect between a fuel cell and at least one
electrical conductor with a material having a boiling point of
at least about 1500° C.

30. A method of making a fuel cell assembly as claimed
in claim 28, wherein the fuel cell has an operating temperature and the step of forming a liquid metal electrical interconnect comprises forming a liquid metal electrical interconnect between a fuel cell and at least one electrical
conductor with a material having a boiling point that is
greater than the operating temperature of the fuel cell.

31. A method of making a fuel cell assembly as claimed
in claim 28, wherein the step of forming a liquid metal
electrical interconnect comprises forming a liquid metal
electrical interconnect between a fuel cell and at least one
electrical conductor with a material having a melting point
of not more than about 100° C.

32. A method of making a fuel cell assembly, comprising
the step of:
forming a liquid metal electrical interconnect/seal that
electrically connects a fuel cell to a reactant tube and
forms a seal between at least one reactant chamber and
the reactant tube.

33. A method of making a fuel cell assembly as claimed
in claim 32, wherein the step of forming a liquid metal
electrical interconnect/seal comprises forming a liquid metal
electrical interconnect/seal that electrically connects a fuel
cell to a reactant tube and forms a seal between at least one
reactant chamber and the reactant tube with a material
having a boiling point of at least about 1500° C.

34. A method of making a fuel cell assembly as claimed
in claim 32, wherein the fuel cell has an operating temperature and the step of forming a liquid metal electrical interconnect/seal comprises forming a liquid metal electrical
interconnect/seal that electrically connects a fuel cell to a
reactant tube and forms a seal between at least one reactant
chamber and the reactant tube with a material having a
boiling point that is greater than the operating temperature of
the fuel cell.

35. A method of making a fuel cell assembly as claimed
in claim 32, wherein the step of forming a liquid metal
electrical interconnect/seal comprises forming a liquid metal
electrical interconnect/seal that electrically connects a fuel
cell to a reactant tube and forms a seal between at least one
reactant chamber and the reactant tube with a material
having a melting point of not more than about 100° C.

36. A fuel cell assembly, comprising:
a housing assembly including at least one reactant chamber and a plurality of housing components, one of
which is a reactant tube that is operably connected to
the reactant chamber;
a fuel cell located within the housing assembly; and
means for electrically connecting the fuel cell to the
reactant tube and forming a seal between the at least
one reactant chamber and the reactant tube that will not
be substantially stressed in response to the at least one
reactant chamber and the reactant tube changing
dimensions at different rates.

* * * * *